United States Patent
Koshii et al.

(10) Patent No.: US 11,296,544 B2
(45) Date of Patent: Apr. 5, 2022

(54) UNINTERRUPTIBLE POWER SUPPLY AND DISCONNECTION MODULE

(71) Applicant: FUJI ELECTRIC CO., LTD., Kawasaki (JP)

(72) Inventors: Keita Koshii, Kobe (JP); Seiitsu Kin, Hachioji (JP); Tomo Kurozaki, Kobe (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 64 days.

(21) Appl. No.: 17/000,467

(22) Filed: Aug. 24, 2020

(65) Prior Publication Data

US 2021/0119476 A1   Apr. 22, 2021

(30) Foreign Application Priority Data

Oct. 16, 2019  (JP) .............................. JP2019-189504

(51) Int. Cl.
  *H02J 9/06*  (2006.01)
  *H02M 7/00*  (2006.01)
  *G06F 1/30*  (2006.01)

(52) U.S. Cl.
  CPC ................. *H02J 9/062* (2013.01); *G06F 1/30* (2013.01); *H02M 7/003* (2013.01)

(58) Field of Classification Search
  CPC ............ H02J 9/062; H02M 7/003; G06F 1/30
  See application file for complete search history.

(56) References Cited

U.S. PATENT DOCUMENTS

| 10,090,703 B2 | 10/2018 | Merkel et al. | |
| 2012/0248897 A1* | 10/2012 | Savolainen | H02J 3/00 307/151 |
| 2016/0226301 A1 | 8/2016 | Lee et al. | |
| 2019/0190312 A1 | 6/2019 | Kin et al. | |
| 2020/0389046 A1* | 12/2020 | Tamai | H02M 7/48 |
| 2021/0119475 A1* | 4/2021 | Tamai | H02J 9/061 |

FOREIGN PATENT DOCUMENTS

| EP | 2887484 A1 | 6/2015 |
| JP | 2004-343908 A | 12/2004 |
| JP | 2010-148197 A | 7/2010 |
| JP | 2011-072068 A | 4/2011 |
| JP | 2016-144355 A | 8/2016 |
| JP | 2018-026969 A | 2/2018 |

* cited by examiner

*Primary Examiner* — Jared Fureman
*Assistant Examiner* — Duc M Pham
(74) *Attorney, Agent, or Firm* — Manabu Kanesaka

(57) ABSTRACT

An uninterruptible power supply includes disconnectors that perform a disconnection operation to electrically disconnect a plurality of uninterruptible power supply modules individually. Each of the disconnectors includes a connection conductor that electrically connects a first conductor to a second conductor, and a moving member mechanically moving the connection conductor in a direction in which the connection conductor approaches and contacts the first conductor and the second conductor, and a direction in which the connection conductor is spaced away from the first conductor and the second conductor.

10 Claims, 13 Drawing Sheets

UNINTERRUPTIBLE POWER SUPPLY AND DISCONNECTION MODULE

CROSS-REFERENCE TO RELATED APPLICATION

The present application claims priority of Japanese Patent Application No. 2019-189504 filed Oct. 16, 2019, the disclosure of which is hereby incorporated by reference.

BACKGROUND OF THE INVENTION

Field of the Invention

The present invention relates to an uninterruptible power supply and a disconnection module, and more particularly, it relates to an uninterruptible power supply and a disconnection module that perform a disconnection operation to electrically disconnect uninterruptible power supply modules.

Description of the Background Art

An uninterruptible power supply including a plurality of uninterruptible power supply modules is known in general, as disclosed in Japanese Patent Laid-Open No. 2011-072068, for example.

Japanese Patent Laid-Open No. 2011-072068 discloses an uninterruptible power supply including a common AC input power supply and a plurality of uninterruptible power supply modules each including a power converter. Each of the plurality of uninterruptible power supply modules includes a switch that electrically disconnects the common AC input power supply from the power converter inside each of the uninterruptible power supply modules. The uninterruptible power supply modules of the uninterruptible power supply disclosed in Japanese Patent Laid-Open No. 2011-072068 are configured such that the common AC input power supply can be electrically disconnected, for each uninterruptible power supply module, from the power converter inside each of the uninterruptible power supply modules by the switch provided for each uninterruptible power supply module.

In the uninterruptible power supply disclosed in Japanese Patent Laid-Open No. 2011-072068, the uninterruptible power supply modules are configured such that the common AC input power supply can be electrically disconnected, for each uninterruptible power supply module, from the power converter inside each of the uninterruptible power supply modules by the switch (disconnector) provided for each uninterruptible power supply module. Although not described in Japanese Patent Laid-Open No. 2011-072068, a magnet switch, for example, is used as a switch provided for each conventional uninterruptible power supply module as disclosed in Japanese Patent Laid-Open No. 2011-072068. A switch such as the magnet switch described above supplies power to a coil, moves a traveling contact by the electromagnetic force of the coil, and switches uninterruptible power supply modules from an electrically disconnected state to an electrically connected state. Therefore, in the magnet switch, it is necessary to connect wiring that supplies power for moving the traveling contact to the switch, and it is necessary to remove the wiring that supplies power for moving the traveling contact during maintenance of the switch. Consequently, the amount of work for maintaining the switch disadvantageously increases.

SUMMARY OF THE INVENTION

The present invention has been proposed in order to solve the aforementioned problem, and an object of the present invention is to provide an uninterruptible power supply and disconnection modules in which an increase in the amount of work for maintaining disconnectors that disconnect uninterruptible power supply modules can be significantly reduced or prevented.

In order to attain the aforementioned object, an uninterruptible power supply according to a first aspect of the present invention includes a plurality of uninterruptible power supply modules each including a power converter that converts power received from an AC power supply outside the uninterruptible power supply, an input/output module that inputs the power received from the AC power supply outside the uninterruptible power supply to the power converter, and outputs the power converted by the power converter to an outside of the uninterruptible power supply, and disconnectors that perform a disconnection operation to electrically disconnect the plurality of uninterruptible power supply modules individually. Each of the disconnectors includes a first conductor electrically connected to a corresponding one of the plurality of uninterruptible power supply modules, a second conductor spaced apart from the first conductor and electrically connected to the input/output module, a connection conductor that electrically connects the first conductor to the second conductor, and a moving member electrically insulated from the connection conductor, the moving member mechanically moving the connection conductor in a first direction, which is a direction in which the connection conductor approaches and contacts the first conductor and the second conductor, and a second direction, which is a direction in which the connection conductor is spaced away from the first conductor and the second conductor.

In the uninterruptible power supply according to the first aspect, as described above, each of the disconnectors includes the first conductor electrically connected to the corresponding one of the plurality of uninterruptible power supply modules, the second conductor spaced apart from the first conductor and electrically connected to the input/output module, the connection conductor that electrically connects the first conductor to the second conductor, and the moving member electrically insulated from the connection conductor, the moving member mechanically moving the connection conductor in the first direction, which is the direction in which the connection conductor approaches and contacts the first conductor and the second conductor, and the second direction, which is the direction in which the connection conductor is spaced away from the first conductor and the second conductor. Accordingly, the connection conductor is mechanically moved by the moving member such that the input/output module can be electrically connected to the uninterruptible power supply module, and the disconnection operation to electrically disconnect the input/output module from the uninterruptible power supply module can be performed without power supply to the disconnector. Therefore, the disconnector does not require connection of wiring that supplies power to move the connection conductor, and during maintenance of the disconnector, an operation of removing the wiring that supplies power to move the connection conductor is not necessary. Consequently, it is possible to provide the uninterruptible power supply capable of significantly reducing or preventing an increase in the amount of work for maintaining the disconnector that disconnects the uninterruptible power supply module.

In the aforementioned uninterruptible power supply according to the first aspect, the moving member preferably includes a screw, and in each of the disconnectors, the screw is preferably rotated in a first rotation direction such that the connection conductor is moved in the first direction, and the screw is preferably rotated in a second rotation direction such that the connection conductor is moved in the second direction. Accordingly, the screw is rotated such that the connection conductor can be moved in the first direction and the second direction, and thus the connection conductor can be easily moved in the first direction and the second direction.

In this case, each of the disconnectors preferably includes a first base that has an insulation property, faces the first conductor and the second conductor, and includes a first facing surface on a side that faces the first conductor and the second conductor, on which the connection conductor is arranged, and the first base is preferably movable in the first direction and the second direction by the screw. Accordingly, the connection conductor is movable in the first direction and the second direction in a state in which a surface of the connection conductor opposite to the surface that faces the first conductor and the second conductor is insulated.

In the aforementioned configuration including the first base, each of the disconnectors preferably includes a second base that has an insulation property, is fixed in a state in which the second base faces the connection conductor, and includes a second facing surface on a side that faces the connection conductor, on which the first conductor and the second conductor are arranged apart from each other, the first base and the second base are preferably connected to each other via the screw, and the first base is preferably movable in the first direction and the second direction with respect to the second base. Accordingly, the first base and the second base are connected to each other via the screw such that the connection conductor can be easily aligned with the first conductor and the second conductor. Furthermore, the first conductor and the second conductor are arranged on the second facing surface of the insulating second base that faces the connection conductor, and thus surfaces of the first conductor and the second conductor opposite to surfaces that face the connection conductor can be insulated.

The aforementioned configuration including the first base preferably further includes, on the screw, a falling-off preventer to prevent the screw from falling off. Accordingly, the falling-off preventer can prevent the screw from falling off while the screw is being rotated (during the disconnection operation).

In the aforementioned configuration including the first base and the second base, at least a portion of the connection conductor preferably overlaps the first conductor and the second conductor, as viewed in a direction perpendicular to the first facing surface. Accordingly, when the connection conductor is moved in the first direction, which is the direction in which the connection conductor approaches and contacts the first conductor and the second conductor, at least a portion of a surface of the connection conductor that faces the first conductor and the second conductor contacts the surfaces of the first conductor and the second conductor that face the connection conductor. Consequently, as compared with a case in which at least a portion of the connection conductor does not overlap the first conductor and the second conductor as viewed in the direction perpendicular to the first facing surface, the connection conductor can be easily electrically connected to the first conductor and the second conductor.

In the aforementioned configuration including the first base and the second base, the first conductor and the second conductor preferably include a plurality of first conductors and a plurality of second conductors corresponding to phases of the corresponding one of the plurality of uninterruptible power supply modules electrically connected to the first conductor, and the connection conductor preferably includes a plurality of connection conductors corresponding to the plurality of first conductors and the plurality of second conductors. Accordingly, the plurality of first conductors and the plurality of second conductors are provided corresponding to the phases, and the plurality of connection conductors is provided corresponding to the plurality of first conductors and the plurality of second conductors such that even when power is transmitted with a plurality of phases such as three-phase alternating current, the input/output module and the uninterruptible power supply module can be electrically connected to and disconnected from each other by a relatively simple structure as compared with a case in which the disconnection operation is performed with an electrical force like a magnet switch. Consequently, even when power is transmitted with a plurality of phases, it is possible to provide the uninterruptible power supply capable of significantly reducing or preventing an increase in the sizes of the disconnectors that disconnect the uninterruptible power supply modules.

In the aforementioned configuration including the first base and the second base, the screw preferably does not overlap the connection conductor, the first conductor, and the second conductor, as viewed in a direction perpendicular to the first facing surface. Accordingly, as compared with a case in which the screw overlaps the connection conductor, the first conductor, and the second conductor as viewed in the direction perpendicular to the first facing surface, the screw can be easily insulated from the connection conductor, the first conductor, and the second conductor.

In the aforementioned configuration including the first base and the second base, the first conductor and the second conductor preferably include a plurality of first conductors and a plurality of second conductors, the connection conductor preferably includes a plurality of connection conductors aligned at intervals corresponding to the plurality of first conductors and the plurality of second conductors, and the screw preferably includes a plurality of screws arranged between the plurality of connection conductors so as to be sandwiched between the plurality of connection conductors in a direction in which the plurality of connection conductors is aligned. Accordingly, as compared with a case in which the screws are not arranged between the plurality of connection conductors when the connection conductors contact the first conductors and the second conductors, spacing apart, from the first conductors and the second conductors, of the connection conductors arranged away from the screws due to warpage of the first base and the second base, for example, can be significantly reduced or prevented.

A disconnection module according to a second aspect of the present invention includes a first conductor electrically connected to an uninterruptible power supply module, a second conductor spaced apart from the first conductor and electrically connected to an input/output module, a connection conductor that electrically connects the first conductor to the second conductor, and a moving member electrically insulated from the connection conductor, the moving member mechanically moving the connection conductor in a first direction, which is a direction in which the connection conductor approaches and contacts the first conductor and the second conductor, and a second direction, which is a direction in which the connection conductor is spaced away from the first conductor and the second conductor.

As described above, the disconnection module according to the second aspect includes the connection conductor that electrically connects the first conductor electrically connected to the uninterruptible power supply module to the second conductor electrically connected to the input/output module, and the moving member electrically insulated from the connection conductor, the moving member mechanically moving the connection conductor in the first direction, which is the direction in which the connection conductor approaches and contacts the first conductor and the second conductor, and the second direction, which is the direction in which the connection conductor is spaced away from the first conductor and the second conductor. Accordingly, the connection conductor is mechanically moved by the moving member such that the input/output module can be electrically connected to the uninterruptible power supply module, and the disconnection operation to electrically disconnect the input/output module from the uninterruptible power supply module can be performed without power supply to a disconnector. Therefore, the disconnector does not require connection of wiring that supplies power to move the connection conductor, and during maintenance of the disconnector, an operation of removing the wiring that supplies power to move the connection conductor is not necessary. Consequently, it is possible to provide the disconnection module capable of significantly reducing or preventing an increase in the amount of work for maintaining the disconnector that disconnects the uninterruptible power supply module.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described with reference to the drawings.
(Overall Configuration of Uninterruptible Power Supply)

The circuit configuration and an arrangement of modules of an uninterruptible power supply 100 according to the present embodiment are now described with reference to FIGS. 1 to 3.

Figure 1:
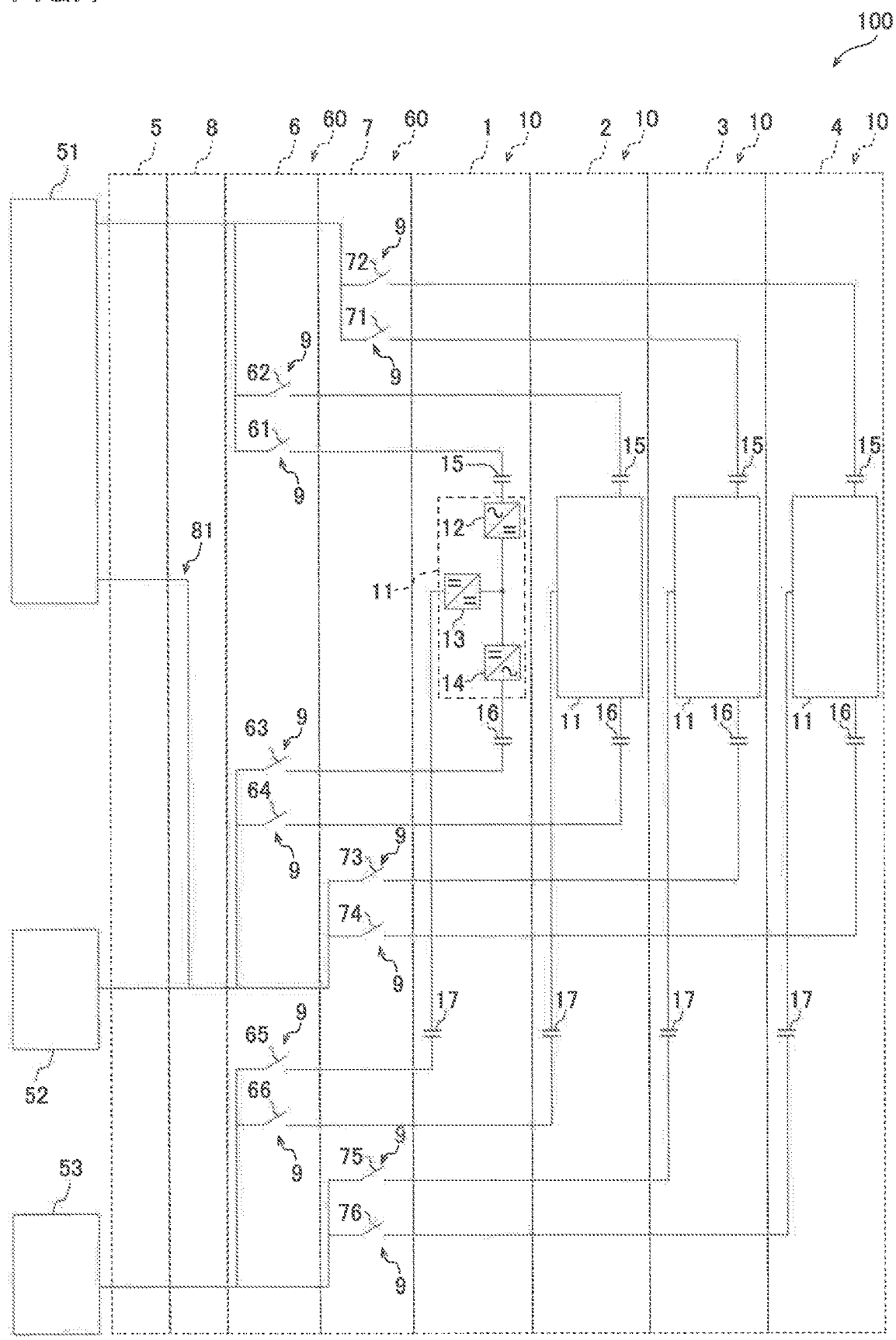
FIG. 1 is a circuit diagram of an uninterruptible power supply according to an embodiment of the present invention.

As shown in FIG. 1, the uninterruptible power supply 100 includes a plurality of uninterruptible power supply modules 10 (a first uninterruptible power supply module 1, a second uninterruptible power supply module 2, a third uninterruptible power supply module 3, and a fourth uninterruptible power supply module 4), an input/output module 5 (I/O module), and disconnection modules 60 (a first disconnection module 6 and a second disconnection module 7). Furthermore, the uninterruptible power supply 100 includes a control module 8. The uninterruptible power supply 100 is configured to receive three-phase (U-phase, V-phase, and W-phase) AC power and output the three-phase AC power. The uninterruptible power supply 100 is also configured to receive two-phase (P-phase and N-phase) DC power.

The plurality of uninterruptible power supply modules 10 includes the first uninterruptible power supply module 1, the second uninterruptible power supply module 2, the third uninterruptible power supply module 3, and the fourth uninterruptible power supply module 4, which are arranged in this order from the input/output module 5 side. Specifically, in the uninterruptible power supply 100 according to the present embodiment, the control module 8, the first disconnection module 6, the second disconnection module 7, the first uninterruptible power supply module 1, the second uninterruptible power supply module 2, the third uninterruptible power supply module 3, and the fourth uninterruptible power supply module 4 are arranged in this order (see FIG. 2) from the input/output module 5 side. FIG. 2 is a diagram of the uninterruptible power supply 100 as viewed from the front side.

In the present embodiment, a direction in which the modules of the uninterruptible power supply 100 are aligned is defined as an X direction, a direction in which the second disconnection module 7 is arranged as viewed from the first uninterruptible power supply module 1 is defined as an X1 direction, and a direction (a direction in which the second uninterruptible power supply module 2 is arranged as viewed from the first uninterruptible power supply module 1) opposite to the X1 direction is defined as an X2 direction. Furthermore, the upward-downward direction of each module of the uninterruptible power supply 100 is defined as a Z direction, the upward direction is defined as a Z1 direction, and the downward direction is defined as a Z2 direction. A direction perpendicular to an XZ plane is defined as a Y direction, the back direction of the uninterruptible power supply 100 is defined as a Y1 direction, and the front direction of the uninterruptible power supply 100 is defined as a Y2 direction.

The plurality of uninterruptible power supply modules 10 (the first uninterruptible power supply module 1, the second uninterruptible power supply module 2, the third uninterruptible power supply module 3, and the fourth uninterruptible power supply module 4) is arranged adjacent to each other. The plurality of uninterruptible power supply modules 10 is arranged electrically parallel to each other. Each of the plurality of uninterruptible power supply modules 10 includes a power converter 11 (see FIG. 1) that converts power received from an AC power supply 51 outside the uninterruptible power supply 100. The power converter 11 includes a rectifier circuit 12, a chopper circuit 13, and an inverter circuit 14.

The rectifier circuit 12 has a function of converting AC power input to the power converter 11 into DC power. The chopper circuit 13 is configured as a three-level chopper circuit, for example. The chopper circuit 13 has a function of transforming a voltage input from a battery 53 and outputting the voltage. DC power input from the battery 53 is input to the chopper circuit 13 via a conductor, a capacitor, and a DC reactor, which are not shown. The inverter circuit 14 has a function of converting DC power input from the rectifier circuit 12 and the chopper circuit 13 into AC power.

Each of the uninterruptible power supply modules 10 also includes AC input-side switches 15. AC power is input from the AC power supply 51 to the AC input-side switches 15. An AC input-side switch 15 is provided for each phase (U-phase, V-phase, and W-phase). In FIGS. 1 and 3, each AC input-side switch 15 is shown collectively for three phases (U-phase, V-phase, and W-phase) for simplification.

Each of the uninterruptible power supply modules 10 also includes AC output-side switches 16. The AC output-side switches 16 are configured to output the AC power from the power converter 11. An AC output-side switch 16 is provided for each phase (U-phase, V-phase, and W-phase). In FIGS. 1 and 3, each AC output-side switch 16 is shown collectively for three phases (U-phase, V-phase, and W-phase) for simplification.

Each of the uninterruptible power supply modules 10 also includes DC input-side switches 17. DC power is input from the battery 53 to the DC input-side switches 17. A DC input-side switch 17 is provided for each phase (P-phase and N-phase). In FIGS. 1 and 3, each DC input-side switch 17 is shown collectively for two phases (P-phase and N-phase) for simplification.

Each of the plurality of uninterruptible power supply modules 10 (the first uninterruptible power supply module 1, the second uninterruptible power supply module 2, the third uninterruptible power supply module 3, and the fourth uninterruptible power supply module 4) includes the power converter 11, the AC input-side switches 15, the AC output-side switches 16, and the DC input-side switches 17.

The input/output module 5 is configured to input power received from the AC power supply 51 outside the uninterruptible power supply 100 to the power converter 11, and to output the power converted by the power converter 11 to the outside. The input/output module 5 is electrically connected to disconnectors 9 of the disconnection modules 60 described below via the control module 8.

The control module 8 controls the plurality of uninterruptible power supply modules 10 (the first uninterruptible power supply module 1, the second uninterruptible power supply module 2, the third uninterruptible power supply module 3, and the fourth uninterruptible power supply module 4). The control module 8 includes a direct transmission circuit 81. The direct transmission circuit 81 is connected to the AC power supply 51 and the output sides (load 52 sides) of the plurality of uninterruptible power supply modules 10.

(Disconnection Modules)

Figure 2:
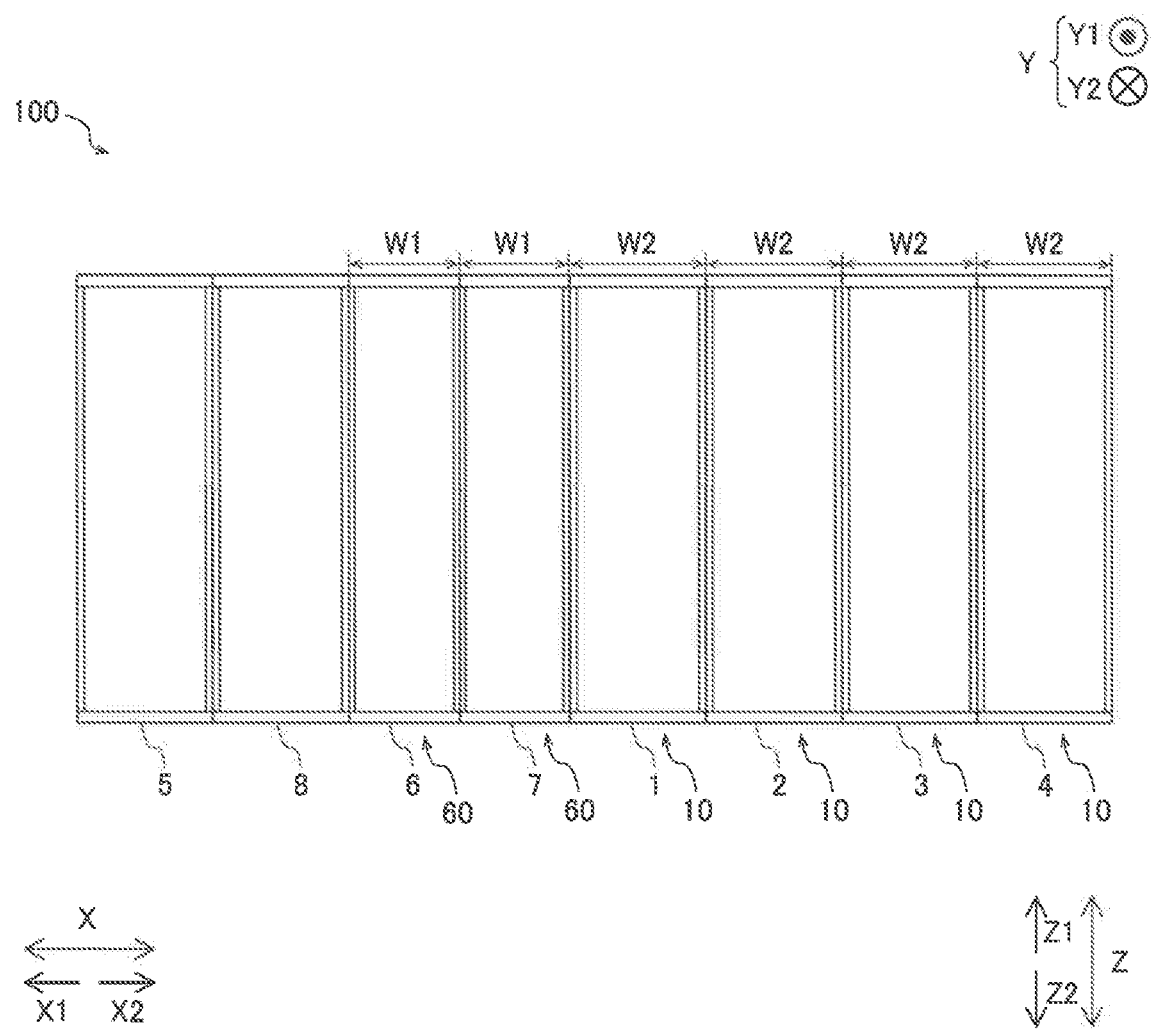
FIG. 2 is a front view schematically showing an arrangement of modules of the uninterruptible power supply according to the embodiment of the present invention.

The disconnection modules 60 (the first disconnection module 6 and the second disconnection module 7) are arranged between the plurality of uninterruptible power supply modules 10 (the first uninterruptible power supply module 1, the second uninterruptible power supply module 2, the third uninterruptible power supply module 3, and the fourth uninterruptible power supply module 4) and the input/output module 5 (see FIG. 2). Furthermore, the width W1 of each of the first disconnection module 6 and the second disconnection module 7 along the X direction is less than a width W2 along the X direction per uninterruptible power supply module 10 (each of the first uninterruptible power supply module 1, the second uninterruptible power supply module 2, the third uninterruptible power supply module 3, and the fourth uninterruptible power supply module 4), as shown in FIG. 2.

Figure 3:
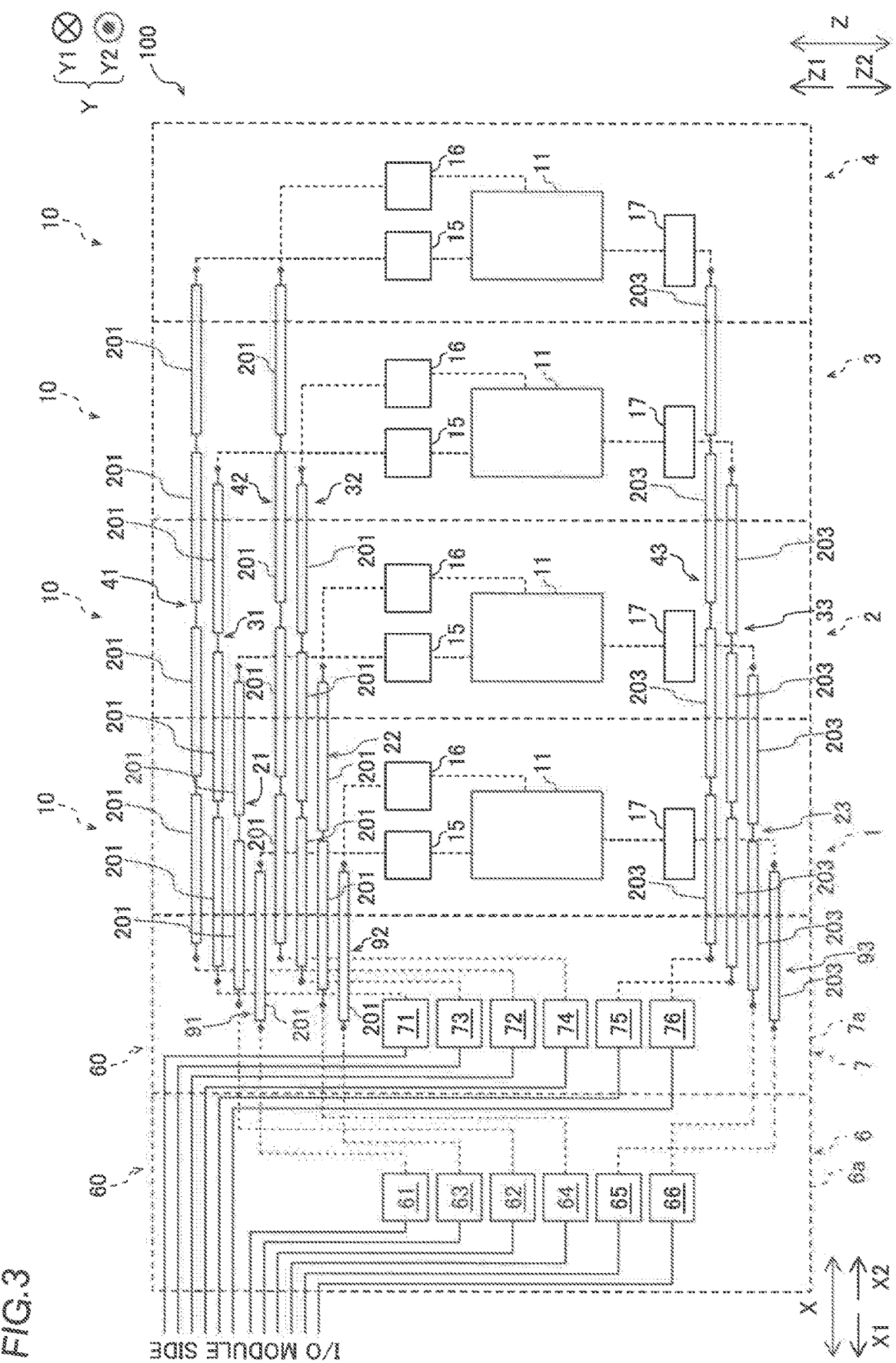
FIG. 3 is a front view schematically showing connections between disconnection modules and uninterruptible power supply modules according to the embodiment of the present invention.

The first disconnection module 6 is arranged between the control module 8 and the second disconnection module 7 (see FIG. 2), and includes a housing 6a that houses a plurality of disconnectors 9 (AC input disconnectors 61 and 62, AC output disconnectors 63 and 64, and DC input disconnectors 65 and 66) that performs a disconnection operation to electrically disconnect each uninterruptible power supply module 10 individually so as to correspond to the first uninterruptible power supply module 1 and the second uninterruptible power supply module 2, respectively (see FIG. 3).

The second disconnection module 7 is arranged between the first disconnection module 6 and the first uninterruptible power supply module 1 (see FIG. 2), and includes a housing 7a that houses a plurality of disconnectors 9 (AC input disconnectors 71 and 72, AC output disconnectors 73 and 74, and DC input disconnectors 75 and 76) that performs a disconnection operation to electrically disconnect each uninterruptible power supply module 10 individually so as to correspond to the third uninterruptible power supply module 3 and the fourth uninterruptible power supply module 4, respectively (see FIG. 3).

Each of the AC input disconnectors 61, 62, 71, and 72 is provided between the AC power supply 51 outside the uninterruptible power supply 100 and a corresponding uninterruptible power supply module 10 (the first uninterruptible power supply module 1, the second uninterruptible power supply module 2, the third uninterruptible power supply module 3, or the fourth uninterruptible power supply module 4).

The AC input disconnectors 61, 62, 71, and 72 are electrically connected to the input/output module 5 via the control module 8. In addition, the AC input disconnectors 61, 62, 71, and 72 are configured to electrically connect the AC input-side switches 15 to the input/output module 5 and to electrically disconnect the AC input-side switches 15 from the input/output module 5.

Each of the AC output disconnectors 63, 64, 73, and 74 is provided on the AC output side of a corresponding uninterruptible power supply module 10.

The AC output disconnectors 63, 64, 73, and 74 are electrically connected to the input/output module 5 via the control module 8. In addition, the AC output disconnectors 63, 64, 73, and 74 are configured to electrically connect the AC output-side switches 16 to the input/output module 5 and to electrically disconnect the AC output-side switches 16 from the input/output module 5.

Each of the DC input disconnectors 65, 66, 75, and 76 is provided on the DC input side of a corresponding uninterruptible power supply module 10.

The DC input disconnectors 65, 66, 75, and 76 are electrically connected to the input/output module 5 via the control module 8. In addition, the DC input disconnectors 65, 66, 75, and 76 are configured to electrically connect the DC input-side switches 17 to the input/output module 5 and to electrically disconnect the DC input-side switches 17 from the input/output module 5.

As shown in FIG. 3, connection wiring 91 electrically connects the AC input-side switches 15 of the first uninterruptible power supply module 1 to the AC input disconnector 61 of the first disconnection module 6. Relay wiring 21 electrically connects the AC input-side switches 15 of the second uninterruptible power supply module 2 to the AC input disconnector 62 of the first disconnection module 6. Relay wiring 31 electrically connects the AC input-side switches 15 of the third uninterruptible power supply module 3 to the AC input disconnector 71 of the second disconnection module 7. Relay wiring 41 electrically connects the AC input-side switches 15 of the fourth uninterruptible power supply module 4 to the AC input disconnector 72 of the second disconnection module 7.

Connection wiring 92 electrically connects the AC output-side switches 16 of the first uninterruptible power supply module 1 to the AC output disconnector 63 of the first disconnection module 6. Relay wiring 22 electrically connects the AC output-side switches 16 of the second uninterruptible power supply module 2 to the AC output disconnector 64 of the first disconnection module 6. Relay wiring 32 electrically connects the AC output-side switches 16 of the third uninterruptible power supply module 3 to the AC output disconnector 73 of the second disconnection module 7. Relay wiring 42 electrically connects the AC output-side switches 16 of the fourth uninterruptible power supply module 4 to the AC output disconnector 74 of the second disconnection module 7.

Connection wiring 93 electrically connects the DC input-side switches 17 of the first uninterruptible power supply module 1 to the DC input disconnector 65 of the first disconnection module 6. Relay wiring 23 electrically connects the DC input-side switches 17 of the second uninterruptible power supply module 2 to the DC input disconnector 66 of the first disconnection module 6. Relay wiring 33 electrically connects the DC input-side switches 17 of the third uninterruptible power supply module 3 to the DC input disconnector 75 of the second disconnection module 7. Relay wiring 43 electrically connects the DC input-side switches 17 of the fourth uninterruptible power supply module 4 to the DC input disconnector 76 of the second disconnection module 7.

(Structure of Connection Wiring and Relay Wiring)

The connection wirings 91 and 92 include one laminated bus bar 201 (see FIG. 3). The laminated bus bar 201 is configured by stacking three plate-shaped conductors (not shown) and insulators that cover the plate-shaped conductors, and the three plate-shaped conductors correspond to the U-phase, the V-phase, and the W-phase, respectively. The relay wiring 21, 22, 31, 32, 41, and 42 are configured by connecting a plurality of laminated bus bars 201 (see FIG. 3).

Figure 4:
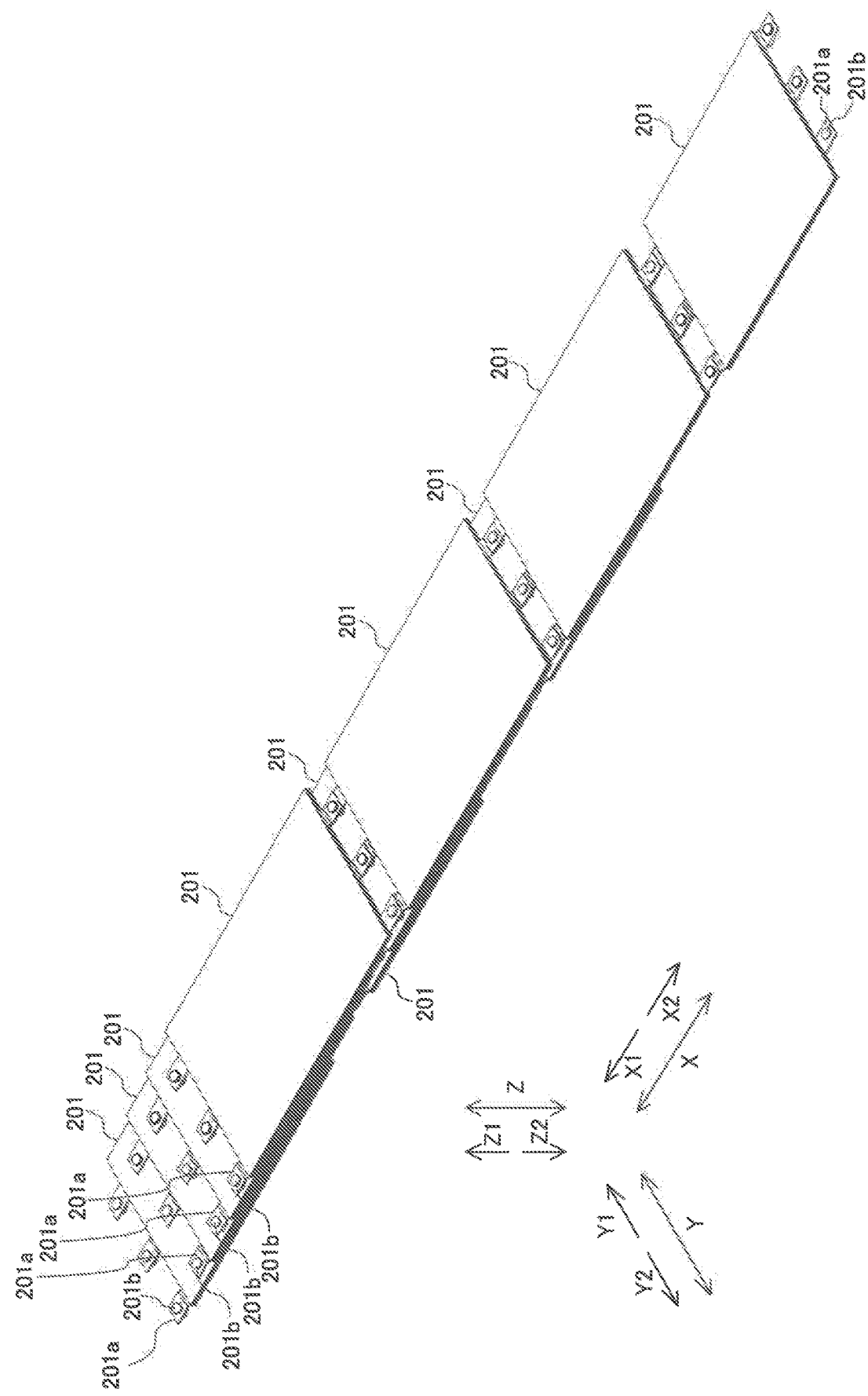
FIG. 4 is a perspective view of laminated bus bars used for connection wiring and relay wiring on the AC input side and the AC output side according to the embodiment of the present invention.

The laminated bus bar 201 includes connection terminals 201*a* (see FIG. 4) to electrically connect a corresponding disconnector 9 to wiring connected to the AC input-side switches 15 or the AC output-side switches 16 inside a corresponding uninterruptible power supply module 10. The connection terminals 201*a* are configured to be electrically connectable to bus bar wiring 202 (see FIG. 6) connected to the disconnector 9 inside a corresponding disconnection module 60 by fastening bolts 201*b*.

The laminated bus bars 201 are misaligned in a horizontal direction (X direction) such that the connection terminals 201*a* do not contact the connection terminals 201*a* of another laminated bus bar 201 (a laminated bus bar 201 having a different connection destination) arranged above (in the Z1 direction) or below (in the Z2 direction) in a state in which the laminated bus bars 201 overlap each other in a plan view.

The connection wiring 93 includes one laminated bus bar 203 (see FIG. 3). The laminated bus bar 203 is configured by stacking two plate-shaped conductors (not shown) and insulators that cover the plate-shaped conductors, and the two plate-shaped conductors correspond to the P-phase and N-phase, respectively. The relay wiring 23, the relay wiring 33, and the relay wiring 43 are configured by connecting a plurality of laminated bus bars 203 (see FIG. 3).

Figure 5:
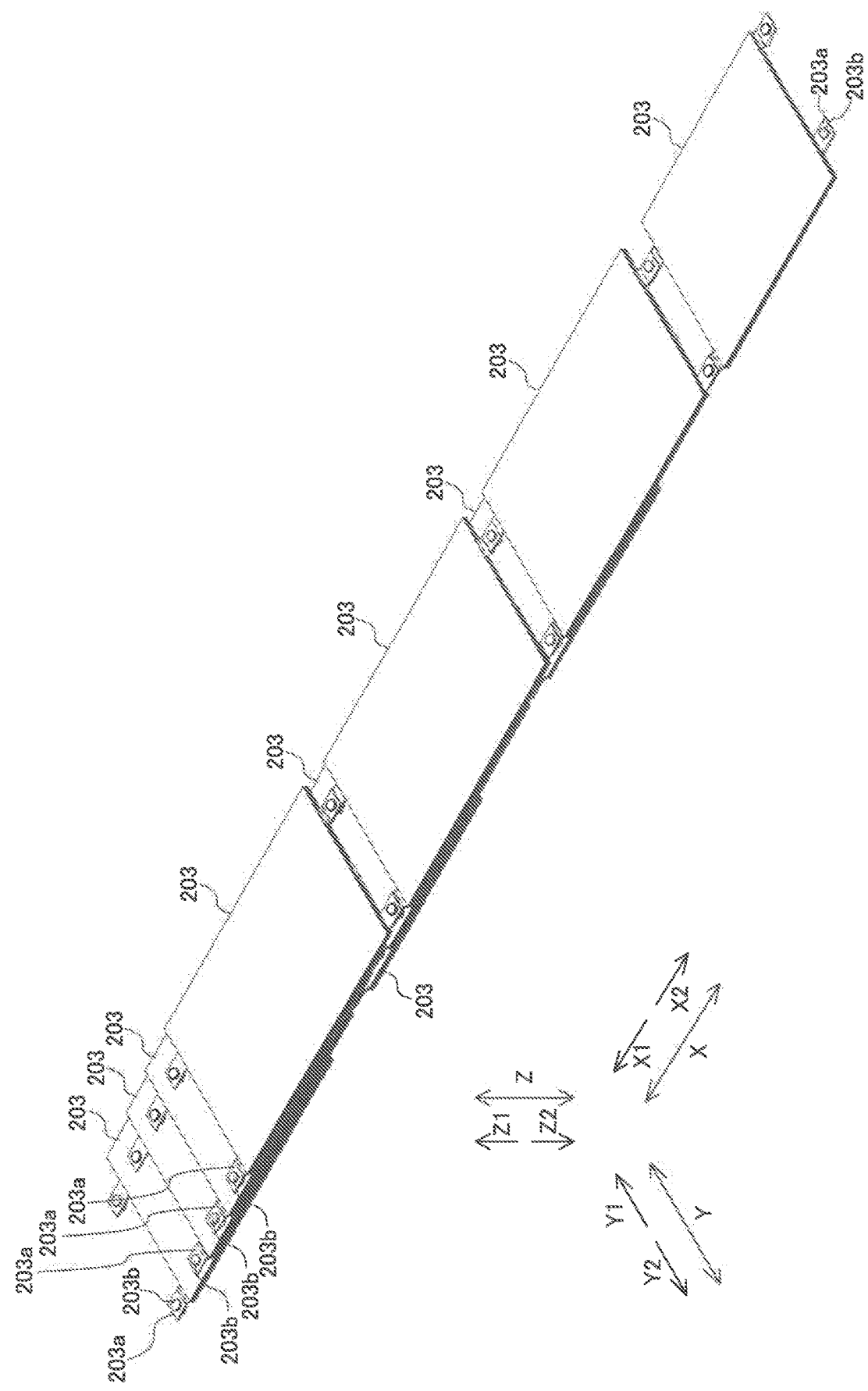
FIG. 5 is a perspective view of laminated bus bars used for connection wiring and relay wiring on the DC input side according to the embodiment of the present invention.

The laminated bus bar 203 includes connection terminals 203*a* (see FIG. 5) to electrically connect a corresponding disconnector 9 to wiring connected to the DC input-side switches 17 inside a corresponding uninterruptible power supply module 10. The connection terminals 203*a* are configured to be electrically connectable to bus bar wiring 204 (see FIG. 6) connected to the disconnector 9 inside a corresponding disconnection module 60 by fastening bolts 203*b*.

The laminated bus bars 203 are misaligned in the horizontal direction (X direction) such that the connection terminals 203*a* do not contact the connection terminals 203*a* of another laminated bus bar 203 (a laminated bus bar 203 having a different connection destination) arranged above (in the Z1 direction) or below (in the Z2 direction) in a state in which the laminated bus bars 203 overlap each other in the plan view.

(Connections Between Laminated Bus Bars and Disconnectors)

Figure 6:
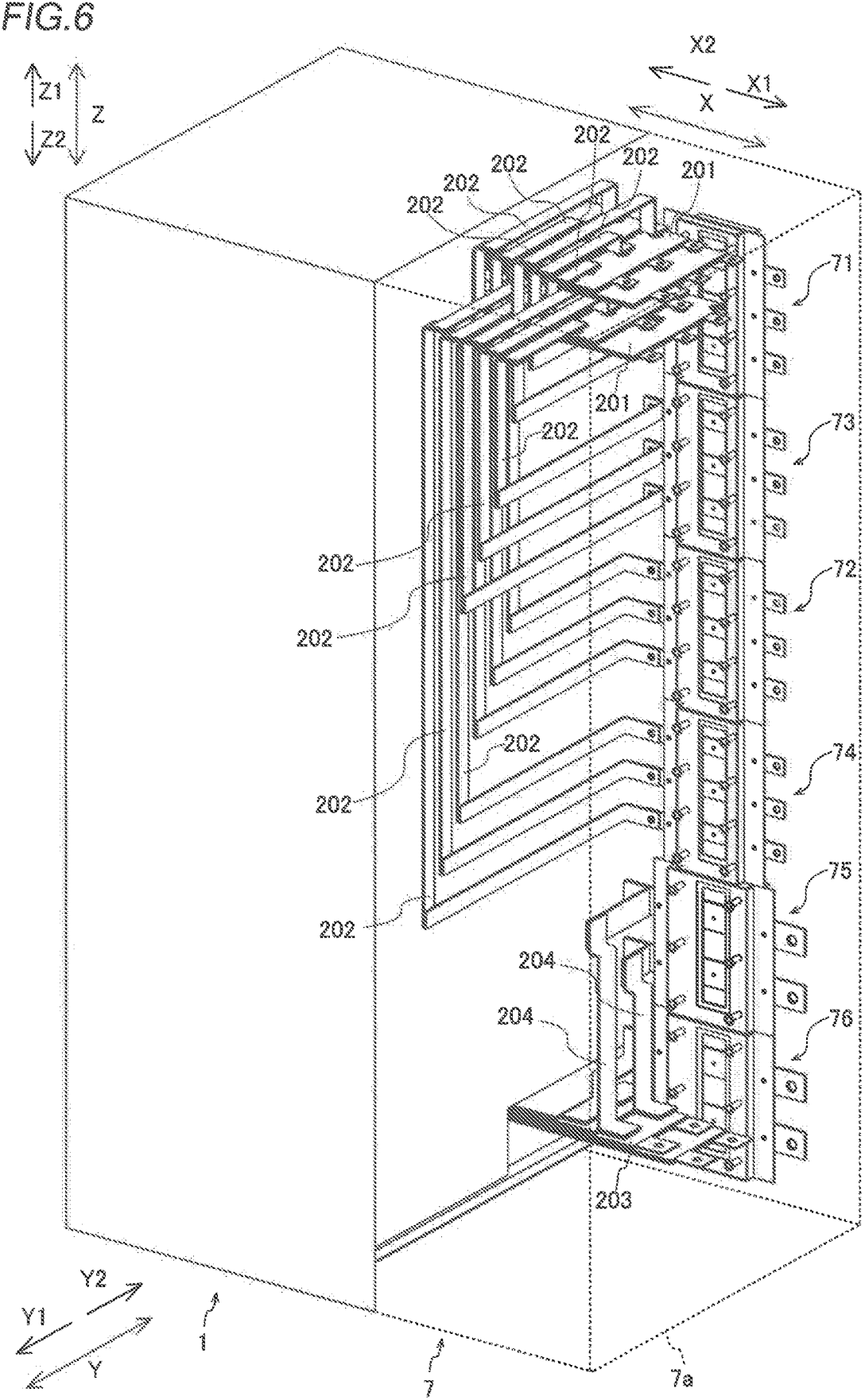
FIG. 6 is a diagram showing connections between the laminated bus bars and disconnectors of a second disconnection module as viewed from the back side of the uninterruptible power supply according to the embodiment of the present invention.

As shown in FIG. 6, the laminated bus bars 201 of the connection wirings 91 and 92 and the relay wirings 21, 22, 31, 32, 41, and 42 enter into the housing 7*a* of the second disconnection module 7 from the first uninterruptible power supply module 1 side (X2 direction side). Furthermore, the laminated bus bars 203 of the connection wiring 93, the relay wiring 23, the relay wiring 33, and the relay wiring 43 enter into the housing 7*a* of the second disconnection module 7 from the first uninterruptible power supply module 1 side (X2 direction side). FIG. 6 shows connections between the third and fourth uninterruptible power supply modules 3 and 4 and the disconnectors 9 (the AC input disconnectors 71 and 72, the AC output disconnectors 73 and 74, and the DC input disconnectors 75 and 76) housed in the housing 7*a* of the second disconnection module 7.

In the housing 7*a* of the second disconnection module 7, the bus bar wiring 202 is connected to the upper surfaces of the connection terminals 201*a* of the laminated bus bars 201.

In addition, the bus bar wiring 202 is routed in the back direction (Y1 direction) so as not to be electrically connected to another bus bar wiring 202 (bus bar wiring 202 having a different connection destination), and is lowered down (in the Z2 direction) to the height of a conductor of a corresponding disconnector 9 (the AC input disconnector 71, the AC input disconnector 72, the AC output disconnector 73, or the AC output disconnector 74). After being lowered down (in the Z2 direction) to the height of the conductor of the corresponding disconnector 9, the bus bar wiring 202 is extended in the front direction (Y2 direction) to contact the conductor of the corresponding disconnector 9.

In the housing 7a of the second disconnection module 7, the bus bar wiring 204 is connected to the upper surfaces of the connection terminals 203a of the laminated bus bars 203. In addition, the bus bar wiring 204 is extended upward (in the Z1 direction) to the height of a conductor of a corresponding disconnector 9 (the DC input disconnector 75 or 76) so as not to contact another bus bar wiring 204 (bus bar wiring 204 having a different connection destination), and then is extended in the front direction (Y2 direction) to contact the conductor of the corresponding disconnector 9.
(Configuration of Disconnector)

The configuration of the AC input disconnector 71 is now described with reference to FIGS. 7 to 12.

Figure 7:
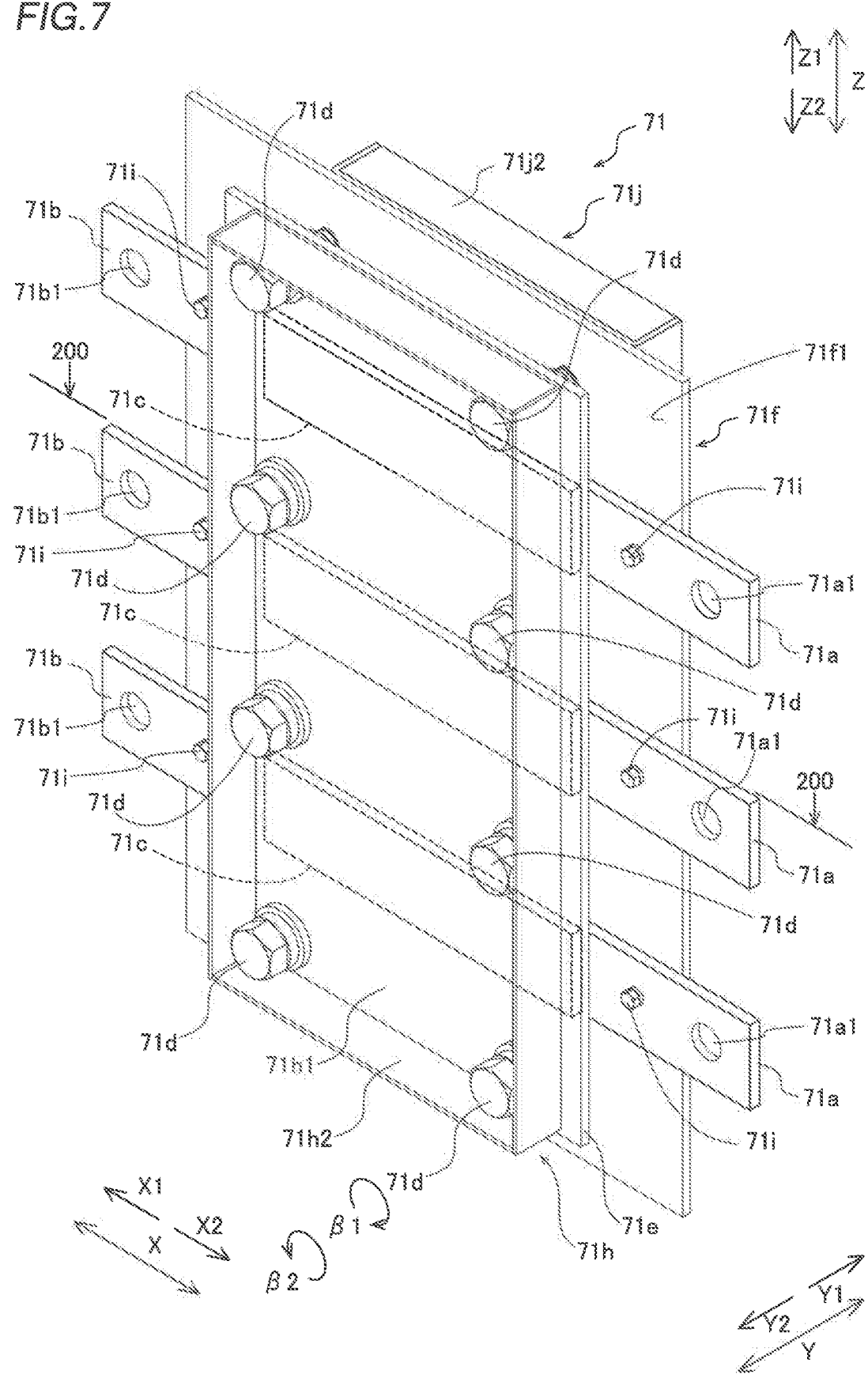
FIG. 7 is a perspective view showing the configuration of an AC input disconnector according to the embodiment of the present invention.

In the present embodiment, the AC input disconnector 71 includes first conductors 71a, second conductors 71b, connection conductors 71c, and screws 71d, as shown in FIG. 7. The AC input disconnector 71 further includes a first insulating plate 71e and a second insulating plate 71f. The screws 71d are examples of a "moving member" in the claims. The first insulating plate 71e is an example of a "first base" in the claims, and the second insulating plate 71f is an example of a "second base" in the claims.

The first conductors 71a are electrically connected to a corresponding uninterruptible power supply module 10. The second conductors 71b are spaced apart from the first conductors 71a (spaced apart in the X direction) and are electrically connected to the input/output module 5. The connection conductors 71c electrically connect the first conductors 71a to the second conductors 71b. The first conductors 71a, the second conductors 71b, and the connection conductors 71c include conductors such as bus bars.

A plurality of first conductors 71a and a plurality of second conductors 71b are provided corresponding to the phases of the uninterruptible power supply module 10 electrically connected to the first conductors 71a, respectively. In the AC input disconnector 71, three first conductors 71a and three second conductors 71b are provided corresponding to the U phase, the V phase, and the W phase. Furthermore, three connection conductors 71c are provided corresponding to the three first conductors 71a and the three second conductors 71b.

The first conductors 71a include bolt holes 71a1 to fasten and fix, to the first conductors 71a, the bus bar wiring 202 electrically connected to the uninterruptible power supply module 10 by bolts (not shown). Furthermore, the second conductors 71b include bolt holes 71b1 to fasten and fix, to the second conductors 71b, the bus bar wiring 202 electrically connected to the input/output module 5 by bolts (not shown).

A plurality of connection conductors 71c is aligned at intervals (in a state of being spaced apart in the Y direction) corresponding to the plurality of first conductors 71a and the plurality of second conductors 71b. A plurality of screws 71d is arranged between the plurality of connection conductors 71c so as to be sandwiched between the plurality of connection conductors 71c in a direction (Z direction) in which the plurality of connection conductors 71c is aligned. The screws 71d are further provided above a first conductor 71a and a second conductor 71b arranged on the uppermost side (Z1 direction side). In addition, the screws 71d are further provided below a first conductor 71a and a second conductor 71b arranged on the lowermost side (Z2 direction side).

Figure 8:
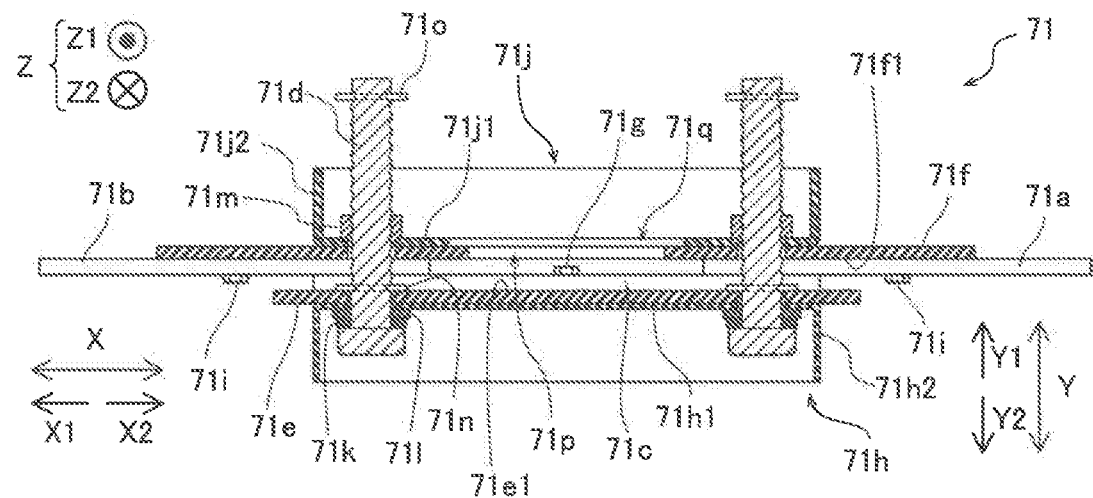
FIG. 8 is a sectional view taken along the line 200-200 in FIG. 7.

The screws 71d do not overlap the first conductors 71a, the second conductors 71b, and the connection conductors 71c, as viewed in a direction (Y direction) perpendicular to a first facing surface 71e1 (a surface of the first insulating plate 71e that faces the first conductors 71a and the second conductors 71b; see FIG. 8). The screws 71d are spaced apart from the first conductors 71a, the second conductors 71b, and the connection conductors 71c by an insulation distance in the direction (Z direction) in which the plurality of connection conductors 71c is aligned so as to be electrically insulated.

In the present embodiment, the first insulating plate 71e faces the first conductors 71a and the second conductors 71b, and the connection conductors 71c are arranged on the first facing surface 71e1 on the side that faces the first conductors 71a and the second conductors 71b. The connection conductors 71c are fastened and fixed to the first insulating plate 71e from the first facing surface 71e1 side by bolts 71g (see FIG. 8). The first insulating plate 71e is a plate-shaped member made of an insulating resin such as Bakelite.

A first reinforcer 71h is provided on a surface of the first insulating plate 71e opposite to the first facing surface 71e1. The first reinforcer 71h is fastened and fixed to the first insulating plate 71e by bolts (not shown). As shown in FIGS. 7 and 8, the first reinforcer 71h has a box shape, and includes a flat portion 71h1 along a surface of the first insulating plate 71e on which the first reinforcer 71h is arranged, and a wall 71h2 formed in a direction (Y direction) substantially perpendicular to the surface of the first insulating plate 71e on which the first reinforcer 71h is arranged. The first reinforcer 71h includes an iron material.

The second insulating plate 71f faces the connection conductors 71c, and the first conductors 71a and the second conductors 71b are spaced apart (in the Y direction) on a second facing surface 71f1 on the side that faces the connection conductors 71c (see FIG. 7). The second insulating plate 71f is fixed to the bus bar wiring 202 via the first conductors 71a and is fixed to wiring on the input/output module 5 side via the second conductors 71b while facing the connection conductors 71 in the housing 7a of the second disconnection module 7. The second insulating plate 71f is fixed to the housing 7a of the second disconnection module 7 by bolts or the like (not shown). The first conductors 71a and the second conductors 71b are fastened and fixed to the second insulating plate 71f from the second facing surface 71f1 side by bolts 71i (see FIG. 8). The second insulating plate 71f is a plate-shaped member made of an insulating resin such as Bakelite.

A second reinforcer 71j is provided on a surface (see FIG. 8) of the second insulating plate 71f opposite to the second facing surface 71f1. The second reinforcer 71j is fastened and fixed to the second insulating plate 71f by bolts (not shown). The second reinforcer 71j has a box shape, and includes a flat portion 71j1 along a surface of the second insulating plate 71f on which the second reinforcer 71j is arranged, and a wall 71j2 formed in a direction (Y direction) substantially perpendicular to the surface of the second insulating plate 71f on which the second reinforcer 71j is arranged. The first reinforcer 71h includes an iron material. The second reinforcer 71j includes an iron material.

An opening 71p is provided in the second insulating plate 71f. Furthermore, an opening 71q is provided in the second reinforcer 71j. The opening 71p and the opening 71q overlap the bolts 71g as viewed in a direction (Y direction) perpendicular to the second facing surface 71f1. Thus, an operator can access the bolts 71g from the second insulating plate 71f side via the opening 71p and the opening 71q (see FIGS. 6 and 8).

In the present embodiment, in a rotation direction about a direction (Y direction) in which the screws 71d extend, as viewed from the second facing surface 71f1 (as viewed from the Y2 direction side), a clockwise rotation direction is defined as β1 (see FIG. 7), and a counterclockwise rotation direction is defined as β2. The clockwise rotation direction β1 is an example of a "first rotation direction" in the claims, and the counterclockwise rotation direction 132 is an example of a "second rotation direction" in the claims.

Spring washers 71k and washers 71l are interposed between heads of the screws 71d and a surface (a surface on the Y2 direction side) of the first reinforcer 71h opposite to a surface on which the first insulating plate 71e is arranged. Furthermore, nuts 71m having threads on their inner surfaces are provided on a surface (a surface on the Y1 direction side) of the second reinforcer 71j opposite to a surface on which the second insulating plate 71f is arranged.

The screws 71d have threads on portions of the outer surfaces thereof, rotate in the β1 direction (first rotation direction) with the threads of the screws 71d and the threads of the nuts 71m in contact with each other to move in the Y1 direction (first direction), and rotate in the β2 direction (second rotation direction) with the threads of the screws 71d and the threads of the nuts 71m in contact with each other to move in the Y2 direction (second direction). The operator manually rotates the screws 71d. The term "manually" refers to manual movement by the operator, and includes moving the screws 71d by the operator using a tool such as an electric tool.

In the present embodiment, retaining rings 71n and 71o are provided on the screws 71d to prevent the screws 71d from falling off. The retaining rings 71n and 71o include E-rings or C-rings. The retaining rings 71n and 71o are examples of a "falling-off preventer" in the claims.

The retaining rings 71n are provided on the screws 71d on the first facing surface 71e1 side of the first insulating plate 71e. The retaining rings 71n are configured such that the screws 71d do not come off (do not fall off) of the first insulating plate 71e on which the connection conductors 71c are arranged when the screws 71d are rotated in the rotation direction β2. The retaining rings 71n are configured to restrict movement of the screws 71d with respect to the first insulating plate 71e in the direction (Y direction) in which the screws 71d extend.

The retaining rings 71o are provided in the vicinity of the tips of the screws 71d on the second facing surface 71f1 side (Y1 direction side) of the second insulating plate 71f. The retaining rings 71o hit the nuts 71m when the screws 71d are rotated in the rotation direction β2 such that the screws 71d do not come off (fall off) of the second insulating plate 71f on which the first conductors 71a and the second conductors 71b are arranged.

The screws 71d pass through holes provided in the first insulating plate 71e and holes of the nuts 71m, and the first insulating plate 71e and the second insulating plate 71f are connected to each other via the screws 71d.

In the present embodiment, the screws 71d are rotated such that the first insulating plate 71e is movable in the Y1 direction (first direction) and the Y2 direction (second direction) with respect to the second insulating plate 71f.

The connection conductors 71c are arranged on the first insulating plate 71e, and thus with movement of the first insulating plate 71e in the Y1 direction (first direction) and the Y2 direction (second direction) with respect to the second insulating plate 71f, the connection conductors 71c also move in the Y1 direction (first direction) and the Y2 direction (second direction).

Figure 9:
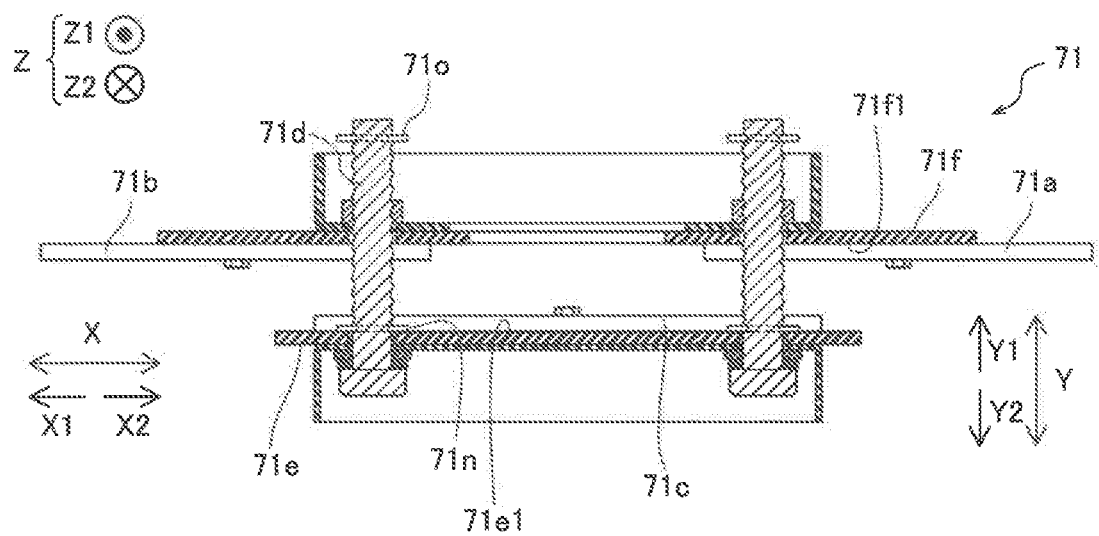
FIG. 9 is a sectional view showing a state in which screws of the AC input disconnector according to the embodiment of the present invention are loosened.
Figure 10:
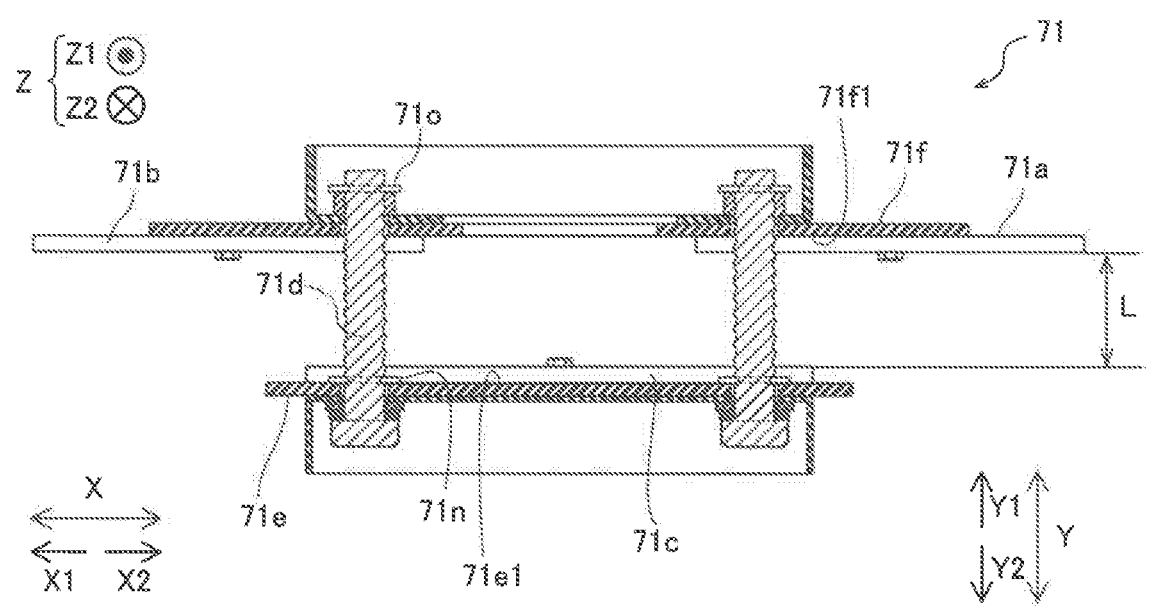
FIG. 10 is a sectional view showing a state in which the screws of the AC input disconnector according to the embodiment of the present invention are loosened, and a connection conductor is spaced apart from a first conductor and a second conductor by an insulation distance.
Figure 11:
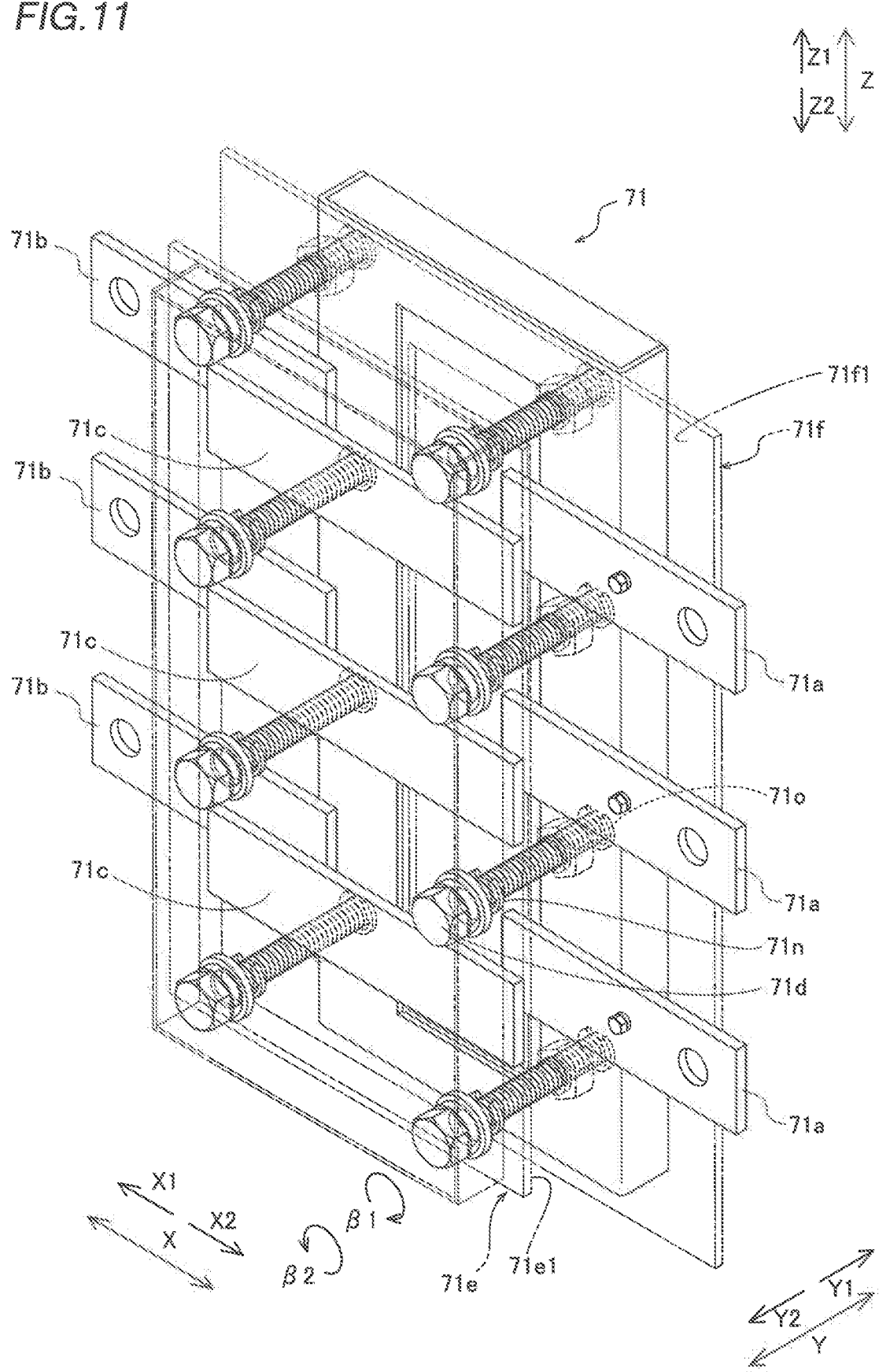
FIG. 11 is a perspective view showing a state in which the screws of the AC input disconnector according to the embodiment of the present invention are loosened.
Figure 12:
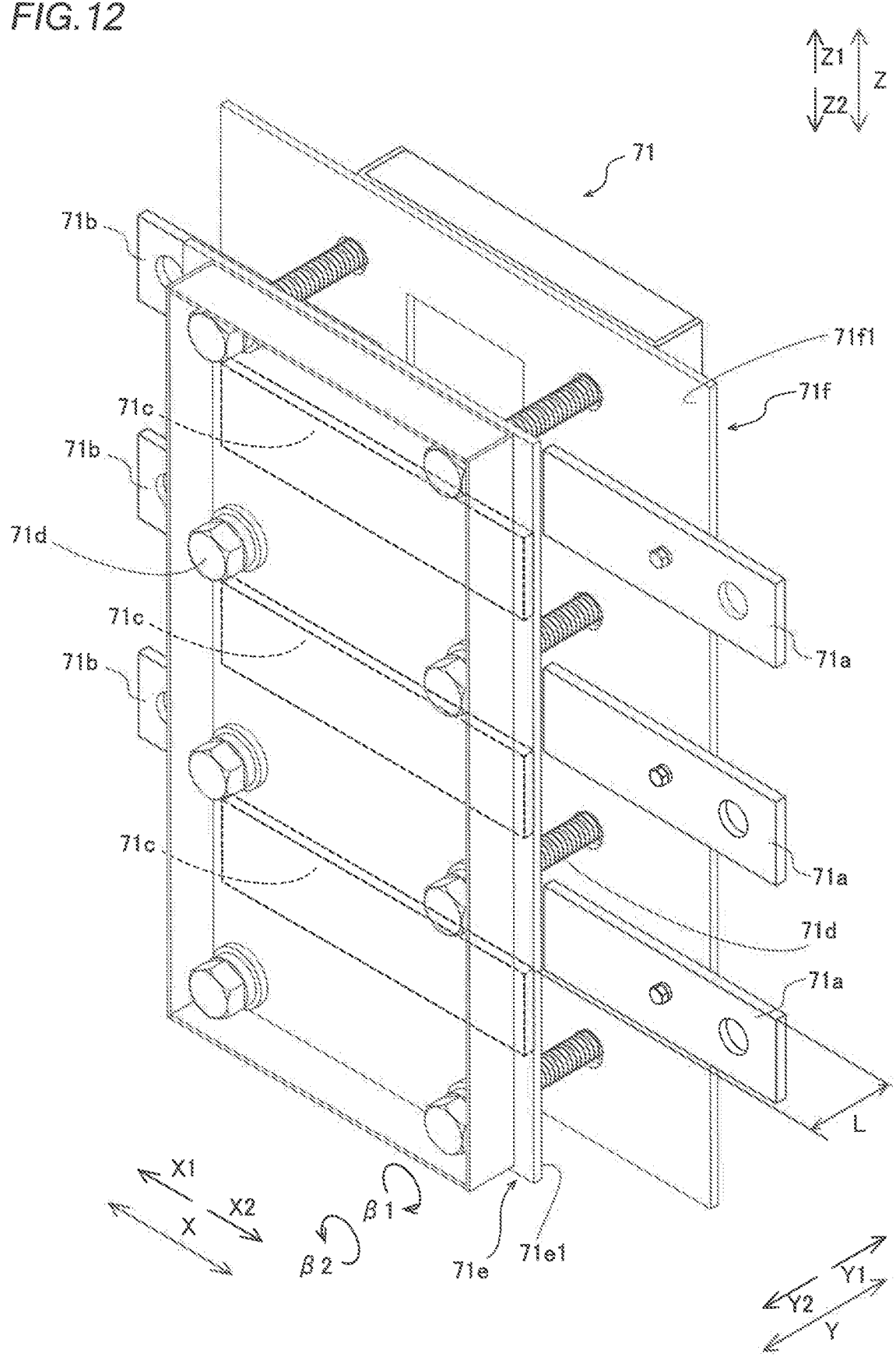
FIG. 12 is a perspective view showing a state in which the screws of the AC input disconnector according to the embodiment of the present invention are loosened, and the connection conductor is spaced apart from the first conductor and the second conductor by the insulation distance.

That is, in the AC input disconnector 71, the screws 71d are rotated in the β1 direction (first rotation direction) such that the connection conductors 71c are mechanically movable in the first direction (Y1 direction), which is a direction in which the connection conductors 71c approach and contact the first conductors 71a and the second conductors 71b (see FIGS. 9 and 10). Furthermore, in the AC input disconnector 71, the screws 71d are rotated in the β2 direction (second rotation direction) such that the connection conductors 71c are mechanically movable in the second direction (Y2 direction), which is a direction in which the connection conductors 71c are spaced away from the first conductors 71a and the second conductors 71b.

As viewed in a direction (Y direction) perpendicular to the first facing surface 71e1, at least portions (the ends on the X1 direction side and the ends on the X2 direction side of the connection conductors 71c) of the connection conductors 71c overlap the first conductors 71a and the second conductors 71b. Thus, in the AC input disconnector 71, the screws 71d are rotated in the β1 direction (first rotation direction) such that the connection conductors 71c contact (electrically connect) the first conductors 71a and the second conductors 71b. Furthermore, in the AC input disconnector 71, the screws 71d are rotated in the β2 direction (second rotation direction) such that the connection conductors 71c are spaced away from the first conductors 71a and the second conductors 71b (see FIGS. 9 and 11). Thus, the first conductors 71a can be electrically disconnected from the second conductors 71b.

In the AC input disconnector 71, the connection conductors 71c are spaced apart from the first conductors 71a and the second conductors 71b by an insulation distance L (FIGS. 10 and 12) such that discharge between the first and second conductors 71a and 71b and the connection conductors 71c can be prevented. An operation for disconnecting by the AC input disconnector 71 (an operation of tightening or loosening the screws 71d) is performed in a state in which the AC input-side switches 15 electrically connected to the AC input disconnector 71 are turned off.

In the AC input disconnector 71, the screws 71d are rotated in the β1 direction (first rotation direction) and are tightened such that the connection conductors 71c contact (are electrically connected to) the first conductors 71a and the second conductors 71b, and thus the operator can determine whether or not the connection conductors 71c sufficiently contact (are electrically connected to) the first conductors 71a and the second conductors 71b based on the torque at the time of tightening the screws 71d.

In the uninterruptible power supply 100 according to the present embodiment, the configurations of the AC input disconnectors 61, 62, and 72 and the AC output disconnectors 63, 64, 73, and 74 are the same as that of the AC input disconnector 71.

Figure 13:
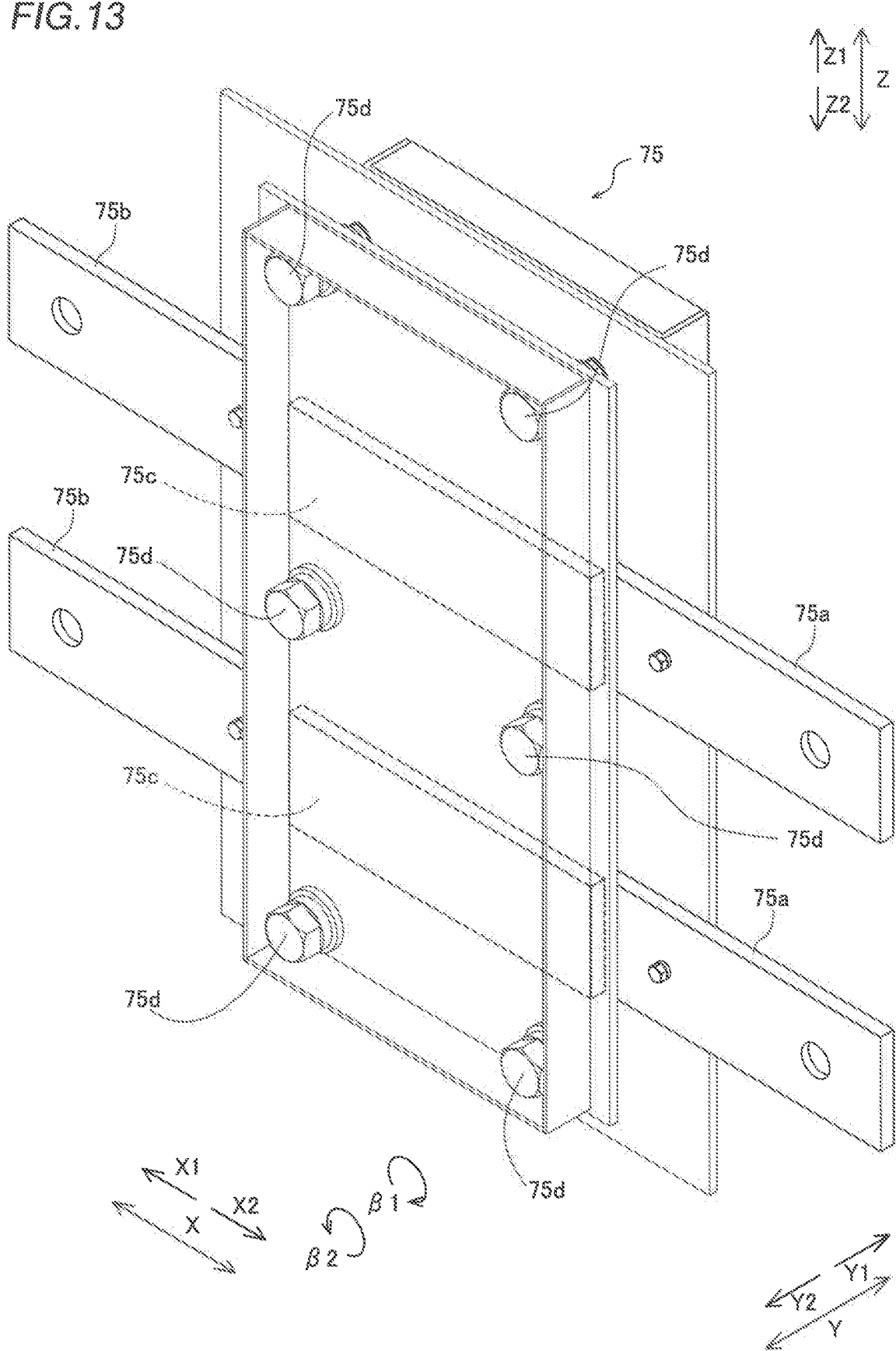
FIG. 13 is a diagram showing the configuration of a DC input disconnector according to the embodiment of the present invention.

The configuration of the DC input disconnector 75 is now described with reference to FIG. 13.

A plurality of first conductors 75a and a plurality of second conductors 75b of the DC input disconnector 75 are provided corresponding to the phases of the uninterruptible power supply module 10 electrically connected to the first conductors 75a, respectively. In the DC input disconnector 75, two first conductors 75a and two second conductors 75b are provided corresponding to the P phase and the N phase. Furthermore, two connection conductors 75c are provided corresponding to the two first conductors 75a and the two second conductors 75b.

A plurality of connection conductors 75c is aligned at intervals corresponding to the plurality of first conductors 75a and the plurality of second conductors 75b. The size (length, width, and thickness) of each of the first conductors 75a, the size (length, width, and thickness) of each of the second conductors 75b, and the size (length, width, and thickness) of each of the connection conductors 75c may be different from or the same as that of each of the first conductors 71a, that of each of the second conductors 71b, and that of each of the connection conductors 71c of the AC input disconnector 71. The sizes of these conductors (the first conductors 71a, the second conductors 71b, the connection conductors 71c, the first conductors 75a, the second conductors 75b, and the connection conductors 75c) may be different for each disconnector 9 or each conductor according to the magnitude of power that flows through the conductors.

A plurality of screws 75d is arranged between the plurality of connection conductors 75c so as to be sandwiched between the plurality of connection conductors 75c in a direction (Z direction) in which the plurality of connection conductors 75c is aligned. The remaining configurations of the DC input disconnector 75 are the same as those of the AC input disconnector 71.

In the uninterruptible power supply 100 according to the present embodiment, the configurations of the DC input disconnectors 65, 66, and 76 are the same as the configuration of the DC input disconnector 75.

(Advantageous Effects of Present Embodiment)

According to the present embodiment, the following advantageous effects are achieved.

According to the present embodiment, as described above, the screws 71d are electrically insulated from the connection conductors 71c, and are moved in the first direction (Y1 direction), which is the direction in which the connection conductors 71c approach and contact the first conductors 71a and the second conductors 71b, and the second direction (Y2 direction), which is the direction in which the connection conductors 71c are spaced away from the first conductors 71a and the second conductors 71b. Accordingly, the connection conductors 71c are mechanically moved by the screws 71d such that the input/output module 5 can be electrically connected to the uninterruptible power supply module 10, and a disconnection operation to electrically disconnect the input/output module 5 from the uninterruptible power supply module 10 can be performed without power supply to the AC input disconnector 71 (disconnector 9). Therefore, the AC input disconnector 71 (disconnector 9) does not require connection of wiring that supplies power to move the connection conductors 71c, and during maintenance of the AC input disconnector 71 (disconnector 9), an operation of removing the wiring that supplies power to move the connection conductors 71c is not necessary. Consequently, it is possible to provide the uninterruptible power supply 100 capable of significantly reducing or preventing an increase in the amount of work for maintaining the AC input disconnector 71 (disconnector 9) that disconnects the uninterruptible power supply module 10.

According to the present embodiment, as described above, in the AC input disconnector 71, the screws 71d are rotated in the first rotation direction (β1 direction) such that the connection conductors 71c are moved in the first direction (Y1 direction), and the screws 71d are rotated in the second rotation direction (β3 direction) such that the connection conductors 71c are moved in the second direction (Y2 direction). Accordingly, the screws 71d are rotated such that the connection conductors 71c can be moved in the first direction (Y1 direction) and the second direction (Y2 direction), and thus the connection conductors 71c can be easily moved in the first direction (Y1 direction) and the second direction (Y2 direction).

According to the present embodiment, as described above, the AC input disconnector 71 includes the first insulating plate 71e that has an insulation property, faces the first conductors 71a and the second conductors 71b, and includes the first facing surface 71e1 on the side that faces the first conductors 71a and the second conductors 71b, on which the connection conductors 71c are arranged, and the first insulating plate 71e is movable in the first direction (Y1 direction) and the second direction (Y2 direction) by the screws 71d. Accordingly, the connection conductors 71c are movable in the first direction (Y1 direction) and the second direction (Y2 direction) in a state in which surfaces of the connection conductors 71c opposite to the surfaces that face the first conductors 71a and the second conductors 71b are insulated.

According to the present embodiment, as described above, the first insulating plate 71e and the second insulating plate 71f are connected to each other via the screws 71d, and the first insulating plate 71e is movable in the first direction (Y1 direction) and the second direction (Y2 direction) with respect to the second insulating plate 71f. Accordingly, the first insulating plate 71e and the second insulating plate 71f are connected to each other via the screws 71d such that the connection conductors 71c can be easily aligned with the first conductors 71a and the second conductors 71b. Furthermore, the first conductors 71a and the second conductors 71b are arranged on the second facing surface 71f1 of the second insulating plate 71f, and thus the surfaces of the first conductors 71a and the second conductors 71b opposite to the surfaces that face the connection conductors 71c can be insulated.

According to the present embodiment, as described above, the retaining rings 71n and 71o are provided on the screws 71d to prevent the screws 71d from falling off. Accordingly, the retaining rings 71n and 71o can prevent the screws 71d from falling off while the screws 71d are being rotated (during the disconnection operation).

According to the present embodiment, as described above, as viewed in the direction (Y direction) perpendicular to the first facing surface 71e1, at least portions of the connection conductors 71c overlap the first conductors 71a and the second conductors 71b. Accordingly, when the connection conductors 71c are moved in the first direction (Y1 direction), which is the direction in which the connection conductors 71c approach and contact the first conductors 71a and the second conductors 71b, at least portions of the surfaces of the connection conductors 71c that face the first conductors 71a and the second conductors 71b contact the surfaces of the first conductors 71a and the second conductors 71b that face the connection conductors 71c. Consequently, as compared with a case in which at least portions of the connection conductors 71c do not overlap the first conductors 71a and the second conductors 71b as viewed in the direction (Y direction) perpendicular to the first facing surface 71e1, the connection conductors 71c can be easily electrically connected to the first conductors 71a and the second conductors 71b.

According to the present embodiment, as described above, the plurality of first conductors 71a and the plurality of second conductors 71b are provided corresponding to the phases of the uninterruptible power supply module 10 electrically connected to the first conductors 71a, respectively, and the plurality of connection conductors 71c is provided corresponding to the first conductors 71a and the second conductors 71b. Accordingly, even when power is transmitted with a plurality of phases such as three-phase alternating current, the input/output module 5 and the uninterruptible power supply modules 10 can be electrically connected to and disconnected from each other by a relatively simple structure as compared with a case in which the disconnection operation is performed with an electrical force like a magnet switch. Consequently, even when power is transmitted with a plurality of phases, it is possible to provide the uninterruptible power supply 100 capable of significantly reducing or preventing an increase in the sizes of the disconnectors 9 that disconnect the uninterruptible power supply modules 10.

According to the present embodiment, as described above, the screws 71d do not overlap the connection conductors 71c, the first conductors 71a, and the second conductors 71b as viewed in the direction (from the Y1 direction side) perpendicular to the first facing surface 71e1. Accordingly, as compared with a case in which the screws 71d overlap the connection conductors 71c, the first conductors 71a, and the second conductors 71b as viewed in the direction (from the Y1 direction side) perpendicular to the first facing surface 71e1, the screws 71d can be easily insulated from the connection conductors 71c, the first conductors 71a, and the second conductors 71b.

According to the present embodiment, as described above, the connection conductors 71c are aligned at intervals corresponding to the plurality of first conductors 71a and the plurality of second conductors 71b, and the plurality of screws 71d is arranged between the plurality of connection conductors 71c so as to be sandwiched between the plurality of connection conductors 71c in the direction (Z direction) in which the plurality of connection conductors 71c is aligned. Accordingly, as compared with a case in which the screws 71d are not arranged between the plurality of connection conductors 71c when the connection conductors 71c contact the first conductors 71a and the second conductors 71b, spacing apart, from the first conductors 71a and the second conductors 71b, of the connection conductors 71c arranged away from the screws 71d due to warpage of the first insulating plate 71e and the second insulating plate 71f, for example, can be significantly reduced or prevented.

Modified Examples

The embodiment disclosed this time must be considered as illustrative in all points and not restrictive. The scope of the present invention is not shown by the above description of the embodiment but by the scope of claims for patent, and all modifications (modified examples) within the meaning and scope equivalent to the scope of claims for patent are further included.

Figure 14:
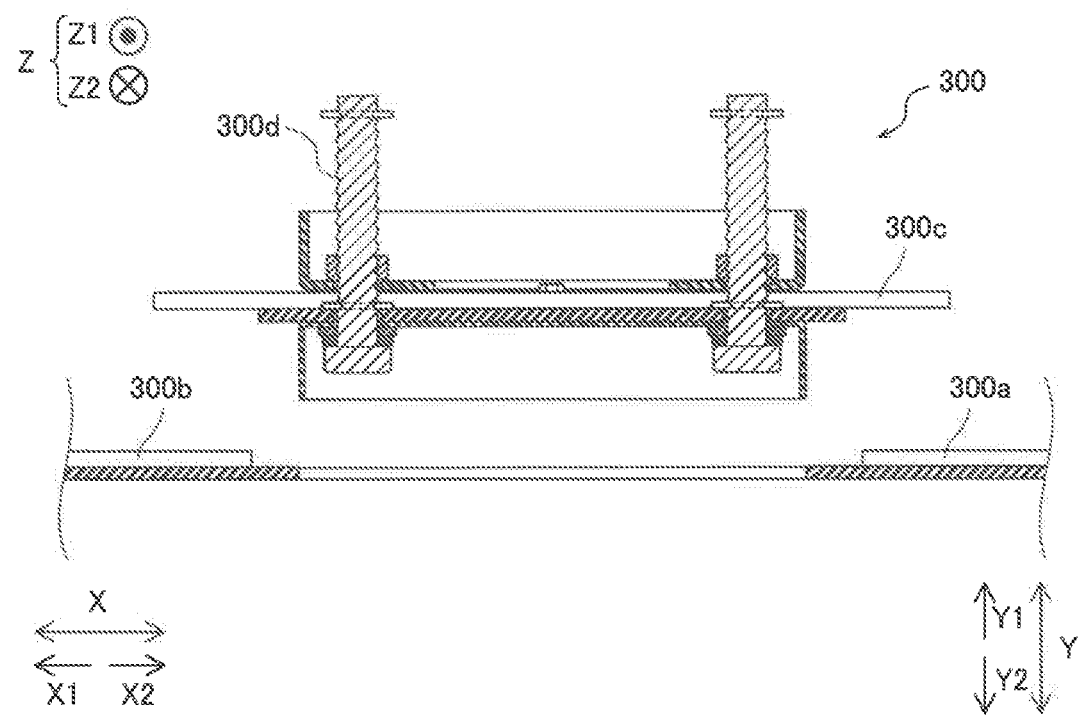
FIG. 14 is a first sectional view showing a disconnector according to a first modified example of the embodiment of the present invention.
Figure 15:
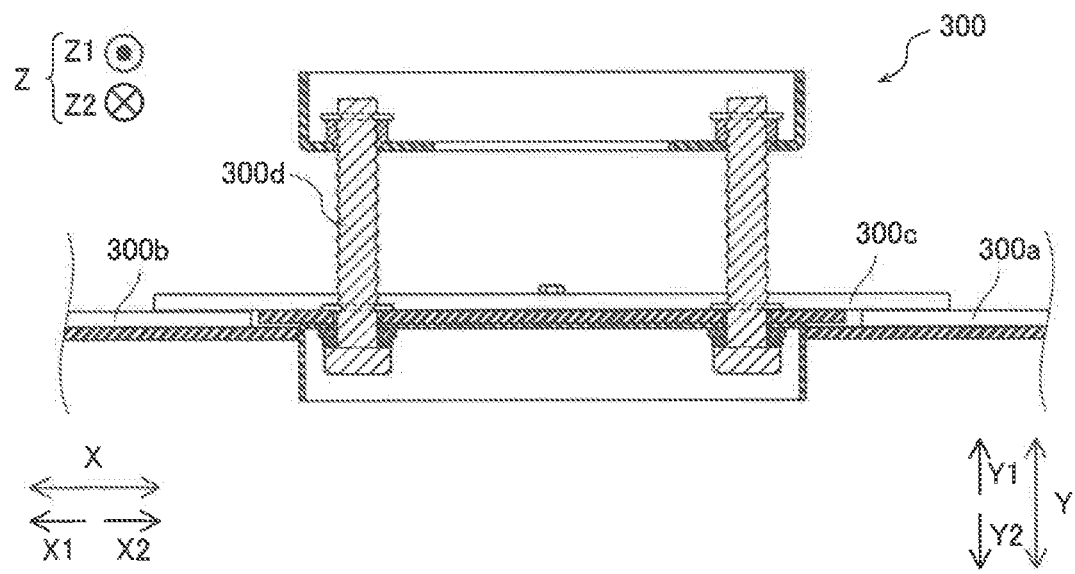
FIG. 15 is a second sectional view showing the disconnector according to the first modified example of the embodiment of the present invention.

For example, while in the AC input disconnector 71, the screws 71d are rotated in the β1 direction (first rotation direction) and are tightened such that the connection conductors 71c contact (are electrically connected to) the first conductors 71a and the second conductors 71b in the aforementioned embodiment, the present invention is not restricted to this. In the present invention, as in a disconnector 300 according to a first modified example, screws 300d may alternatively be tightened such that connection conductors 300c are spaced apart from first conductors 300a and second conductors 300b (see FIG. 14), and the screws 300d may alternatively be loosened such that the connection conductors 300c contact (are electrically connected to) the first conductors 300a and the second conductors 300b (see FIG. 15).

While the disconnectors 9 are housed in the housing 6a of the first disconnection module 6 and the housing 7a of the second disconnection module 7 in the aforementioned embodiment, the present invention is not restricted to this. In the present invention, all the disconnectors may alternatively be provided in the housing of one disconnection module. Furthermore, the disconnectors may not be housed in the housings of the disconnection modules, but may alternatively be housed in housings of the input/output module, the control module, and the uninterruptible power supply modules, or provided outside the housings.

While the plurality of screws 71d (moving members) is arranged between the plurality of connection conductors 71c so as to be sandwiched between the plurality of connection conductors 71c in the direction (Z direction) in which the plurality of connection conductors 71c is aligned in the aforementioned embodiment, the present invention is not restricted to this. In the present invention, the moving members may not be arranged between the plurality of connection conductors, but the moving members may alternatively be arranged only on the outer sides of the connection conductors arranged on the outermost side in the direction in which the plurality of connection conductors is aligned.

While the screws 71d (moving members) do not overlap the connection conductors 71c, the first conductors 71a, and the second conductors 71b as viewed in the direction (from the Y1 direction side) perpendicular to the first facing surface 71e1 in the aforementioned embodiment, the present invention is not restricted to this. In the present invention, the moving members may alternatively overlap the connection conductors, the first conductors, and the second conductors as viewed in the direction perpendicular to the first facing surface.

While the plurality of first conductors 71a and the plurality of second conductors 71b is arranged on one second insulating plate 71f (second base) in the aforementioned embodiment, the present invention is not restricted to this. In the present invention, in the disconnectors, a plurality of second bases may alternatively be provided corresponding to the number of plurality of first conductors and the number of plurality of second conductors, and one first conductor and one second conductor may alternatively be arranged on each of the plurality of second bases.

While the plurality of connection conductors 71c is arranged on one first insulating plate 71e (first base) in the aforementioned embodiment, the present invention is not restricted to this. In the present invention, in the disconnectors, a plurality of first bases may alternatively be provided corresponding to the number of plurality of connection conductors, and one connection conductor may alternatively be arranged on each of the plurality of first bases.

While the retaining rings 71n and 71o (falling-off preventers) are provided on the screws 71d (moving members) to prevent the screws 71d from falling off in the aforementioned embodiment, the present invention is not restricted to this. In the present invention, the falling-off preventers may not be provided on the moving members, but the moving members themselves may alternatively include structures for preventing the moving members from falling off.

While the first insulating plate 71e (first base) and the second insulating plate 71f (second base) are connected to each other via the screws 71d (moving members), and the first insulating plate 71e is movable in the first direction (Y1 direction) and the second direction (Y2 direction) with respect to the second insulating plate 71f in the aforementioned embodiment, the present invention is not restricted to this. In the present invention, the first base may alternatively be connected to a fixed member (such as a module housing) other than the second base via the moving members, and the first insulating plate may alternatively be moved in the first direction and the second direction with respect to the second insulating plate.

While the uninterruptible power supply 100 includes the four uninterruptible power supply modules 10 (the first uninterruptible power supply module 1, the second uninterruptible power supply module 2, the third uninterruptible power supply module 3, and the fourth uninterruptible power supply module 4) in the aforementioned embodiment, the present invention is not restricted to this. For example, the uninterruptible power supply may alternatively include two, three, or five or more uninterruptible power supply modules.

While the uninterruptible power supply 100 includes the two disconnection modules 60 (the first disconnection module 6 and the second disconnection module 7) in the aforementioned embodiment, the present invention is not restricted to this. For example, one uninterruptible power supply may alternatively include one disconnection module or three or more disconnection modules.

While the disconnectors 9 include the AC input disconnectors 61, 62, 71, and 72 provided on the AC input sides of the uninterruptible power supply modules 10, the AC output disconnectors 63, 64, 73, and 74 provided on the AC output sides of the uninterruptible power supply modules 10, and the DC input disconnectors 65, 66, 75, and 76 provided on the DC input sides of the uninterruptible power supply modules 10 in the aforementioned embodiment, the present invention is not restricted to this. In the present invention, the disconnectors may alternatively be provided on one or two of the AC input sides, the AC output sides, and the DC input sides of the uninterruptible power supply modules.

What is claimed is:

1. An uninterruptible power supply comprising:
a plurality of uninterruptible power supply modules each including a power converter that converts power received from an AC power supply outside the uninterruptible power supply;
an input/output module that inputs the power received from the AC power supply outside the uninterruptible power supply to the power converter, and outputs the power converted by the power converter to an outside of the uninterruptible power supply; and
disconnectors that perform a disconnection operation to electrically disconnect the plurality of uninterruptible power supply modules individually; wherein
each of the disconnectors includes:
a first conductor electrically connected to a corresponding one of the plurality of uninterruptible power supply modules;
a second conductor spaced apart from the first conductor and electrically connected to the input/output module;
a connection conductor that electrically connects the first conductor to the second conductor; and
a moving member electrically insulated from the connection conductor, the moving member mechanically moving the connection conductor in a first direction, which is a direction in which the connection conductor approaches and contacts the first conductor and the second conductor, and a second direction, which is a direction in which the connection conductor is spaced away from the first conductor and the second conductor.

2. The uninterruptible power supply according to claim 1, wherein the moving member includes a screw; and
in each of the disconnectors, the screw is rotated in a first rotation direction such that the connection conductor is moved in the first direction, and the screw is rotated in a second rotation direction such that the connection conductor is moved in the second direction.

3. The uninterruptible power supply according to claim 2, wherein each of the disconnectors includes a first base that has an insulation property, faces the first conductor and the second conductor, and includes a first facing surface on a side that faces the first conductor and the second conductor, on which the connection conductor is arranged; and
the first base is movable in the first direction and the second direction by the screw.

4. The uninterruptible power supply according to claim 3, wherein each of the disconnectors includes a second base that has an insulation property, is fixed in a state in which the second base faces the connection conductor, and includes a second facing surface on a side that faces the connection conductor, on which the first conductor and the second conductor are arranged apart from each other; and
the first base and the second base are connected to each other via the screw, and the first base is movable in the first direction and the second direction with respect to the second base.

5. The uninterruptible power supply according to claim 4, wherein at least a portion of the connection conductor overlaps the first conductor and the second conductor, as viewed in a direction perpendicular to the first facing surface.

6. The uninterruptible power supply according to claim 4, wherein
the first conductor and the second conductor include a plurality of first conductors and a plurality of second conductors corresponding to phases of the corresponding one of the plurality of uninterruptible power supply modules electrically connected to the first conductor; and
the connection conductor includes a plurality of connection conductors corresponding to the plurality of first conductors and the plurality of second conductors.

7. The uninterruptible power supply according to claim 4, wherein the screw does not overlap the connection conductor, the first conductor, and the second conductor, as viewed in a direction perpendicular to the first facing surface.

8. The uninterruptible power supply according to claim 3, further comprising, on the screw, a falling-off preventer to prevent the screw from falling off.

9. The uninterruptible power supply according to claim 4, wherein
- the first conductor and the second conductor include a plurality of first conductors and a plurality of second conductors;
- the connection conductor includes a plurality of connection conductors aligned at intervals corresponding to the plurality of first conductors and the plurality of second conductors; and
- the screw includes a plurality of screws arranged between the plurality of connection conductors so as to be sandwiched between the plurality of connection conductors in a direction in which the plurality of connection conductors is aligned.

10. A disconnection module comprising:
- a first conductor electrically connected to an uninterruptible power supply module;
- a second conductor spaced apart from the first conductor and electrically connected to an input/output module;
- a connection conductor that electrically connects the first conductor to the second conductor; and
- a moving member electrically insulated from the connection conductor, the moving member mechanically moving the connection conductor in a first direction, which is a direction in which the connection conductor approaches and contacts the first conductor and the second conductor, and a second direction, which is a direction in which the connection conductor is spaced away from the first conductor and the second conductor.

\* \* \* \* \*